United States Patent [19]

Tamplin

[11] Patent Number: 5,660,085
[45] Date of Patent: Aug. 26, 1997

[54] HANDLEBAR ASSEMBLY PROVIDING IMPROVED HAND POSITIONING AND CONTROL MECHANISM USE

[76] Inventor: Nelson E. Tamplin, 621 Aurora Ave., Boulder, Colo. 80302

[21] Appl. No.: 583,759

[22] Filed: Jan. 11, 1996

Related U.S. Application Data

[63] Continuation of Ser. No. 182,747, Jan. 18, 1994, abandoned.

[51] Int. Cl.$^6$ .............. B62K 21/16; B62K 23/06
[52] U.S. Cl. ............... 74/551.3; 74/551.1; 74/489
[58] Field of Search .................. 74/551.3, 551.1, 74/551.8, 502.2, 489, 488; 280/278, 279

[56] References Cited

U.S. PATENT DOCUMENTS

| | | |
|---|---|---|
| 439,129 | 10/1890 | Durkee . |
| 588,166 | 8/1897 | McCoy . |
| 1,068,158 | 7/1913 | Noack . |
| 3,915,028 | 10/1975 | Kine ............................. 74/489 X |
| 3,977,270 | 8/1976 | Cristie .......................... 74/489 X |
| 4,304,145 | 12/1981 | Shimano ........................ 74/489 X |
| 5,144,859 | 9/1992 | Malone ......................... 74/551.3 |
| 5,197,350 | 3/1993 | Borromeo ..................... 74/551.3 X |
| 5,257,683 | 11/1993 | Romano ........................ 74/489 X |
| 5,319,995 | 6/1994 | Huang .......................... 74/551.3 X |
| 5,392,669 | 2/1995 | Li ................................ 74/551.8 X |

FOREIGN PATENT DOCUMENTS

| | | |
|---|---|---|
| 451284 | 9/1948 | Canada . |
| 325192 | 9/1902 | France . |
| 2535669 | 5/1984 | France . |
| 677383 | 6/1939 | Germany ....................... 74/551.3 |
| 3143714 | 5/1983 | Germany . |
| 10897 | of 1912 | United Kingdom ............. 74/551.3 |
| 665529 | 1/1952 | United Kingdom . |

*Primary Examiner*—Rodney H. Bonck
*Assistant Examiner*—Mary Ann Battista
*Attorney, Agent, or Firm*—John R. Flanagan

[57] ABSTRACT

An H-shaped bicycle handlebar assembly includes an elongated cross bar extending in a generally transverse relationship to a longitudinal vertical median plane through the handlebar assembly and a pair of end structures attached adjacent to respective opposite ends of the cross bar being spaced in opposite lateral directions away from the longitudinal vertical median plane. Each end structure includes a pair of forwardly and rearwardly directed bars extending in forward and rearward directions from a respective one opposite end of the cross bar such that the cross bar in combination with the end structures thereby define a generally H-shape. Also, each end structure includes an end attachment mechanism attaching the respective pair of forwardly and rearwardly directed bars at a location therebetween adjacent to the respective one opposite end of the cross bar. The end attachment mechanisms can be releasable and adjustable so as to permit changing the angle of inclination of the end structures about the opposite ends of the cross bar relative to a horizontal reference plane and also to permit changing of the positions of the end structures along the cross bar. The forwardly and rearwardly directed bars can be provided in alignment with one another or in various angular relationships to one another and to the cross bar.

27 Claims, 2 Drawing Sheets

HANDLEBAR ASSEMBLY PROVIDING IMPROVED HAND POSITIONING AND CONTROL MECHANISM USE

This is a continuation of application Ser. No. 08/182,747, filed Jan. 18, 1994 now abandoned.

TECHNICAL FIELD

The present invention generally relates to bicycle handlebars and, more particularly, is concerned with an improved bicycle handlebar assembly that provides a plurality of handgrip positions and a plurality of locations for mounting shift and brake control devices to provide improved access thereto from a plurality of handgrip locations on the handlebar assembly. The present invention is also concerned with improved brake levers which are accessible from the plurality of handgrip locations on the handlebar assembly.

BACKGROUND OF THE INVENTION

In the field of bicycle riding, every comfort and control advantage is of great importance to the cyclist. The activity of riding leads to fatigue and stresses on various parts of the body, including the hands and arms. By affecting the position and use of the hands and arms, the handlebar of the bicycle is directly involved in the generation of fatigue in these parts of the body. The rider will wish to minimize fatigue and stresses in order to improve comfort, endurance, and ability to safely control the bicycle.

In bicycle riding, the rider must control the position and direction of the bicycle, gear selection, and speed of descent. The handlebar is involved in all these facets of riding. The handlebar area serves as a control center having shift levers and brake levers as well as handgrip positions for maintaining balance, supporting body weight, and steering the bicycle. Therefore, control is affected by both the functionality of the handlebar and the fatigue of the rider, and control is necessary for both performance and safety.

Stresses that lead to fatigue and the need for control are increased by riding on minimally prepared, rough, and steeply sloped roads and trails. These conditions increase the bumpiness of the ride, the need to maneuver around and over obstacles, and the need to quickly shift gears. These conditions also increase the need to reduce speed by applying brakes quickly and firmly, and in the case of a long descent, for a long period of time. As a result of absorbing the shock of traveling over bumps, the increased shifting and maneuvering, and the increased use of the brakes, the rider's hands and arms are subjected to greater stress. Hands and arms must be used more often and more effectively to control the bicycle.

The needs for comfort and control are also readily made apparent on rides of long duration and as well as rides by recreational, occasional cyclists. Rides of long duration for any type of rider bring fatigue in the hands and arms. Occasional cyclists are not as physically conditioned as competitive riders, which increases their susceptibility to stresses and fatigue. For any type of rider, fatigue reduces the rider's level of performance in terms of endurance, speed and control. In riding on either roads or minimally prepared trails, a rider will attempt to reduce fatigue and conserve energy for travelling farther or faster, which will help the rider achieve a competitive advantage or simply accomplish personal riding goals. Similarly, both types of riders will avoid fatigue to avoid losing quickness, accuracy, and safety in executing maneuvers for control. Thus, both competitive cyclists and recreational riders benefit from a reduction in fatigue.

Consequently, handlebars that reduce fatigue and increase control will provide an advantage under many situations encountered in bicycle riding. The need for handlebars that are more effective at reducing fatigue and increasing control has motivated the present invention.

Several handlebar designs known in the prior art orient the rider in an aerodynamic position. However, these handlebars have limited ability to reduce hand and arm fatigue and to enhance control. As noted above, these problems are present in riding on all surfaces, yet they are particularly noticeable on minimally prepared trails and roads. In road riding and racing, on the other hand, the level of concern is often lower for fatigue of hands and arms or for control, and the concern is often higher for aerodynamic advantage. Another common type of prior art handlebar, the generally straight bar currently found on mountain bikes, has limitations concerning the hand positions available and the options for control lever arrangement. In both cases, these limitations relate to the hand positions provided and the effect these have on the rider's comfort and control.

One of these types of prior art handlebars, primarily found on bicycles for riding on roads and for racing, orients the rider in an aerodynamic body position. Several designs in this category have a primary limitation that the handlebar causes the bicyclist to remain in the forward leaning position. In some cases, these handlebars allow an alternative handgrip that raises the body. This alternative hand position provides limited access to control levers and limited leverage on the handlebars for turning control.

In many situations, an aerodynamic position and the alternative hand positions available with these handlebars are not appropriate. When riding on steeply sloped terrain, the rider will desire to shift the body position to transfer the appropriate amount of weight to each of the two wheels. Ascending is facilitated by shifting the body position and weight forward relative to the position when riding on a near level surface, and descending is facilitated by shifting weight rearward. Handlebars allowing good control of the bicycle by providing forward and rearward handgrip positions would assist the rider in these situations. Furthermore, in ascending and near flat travel, proper use of muscle groups is assisted by handlebars that allow the rider to lean forward to the appropriate degree.

Riding on rough trails places several additional requirements on the rider. It requires that the rider absorb the larger jolts, vibrations, and change in attitude of the bicycle as it travels over bumps, it requires that the rider have rapid access to control levers from various handgrip positions, and it requires that the rider retain control by maintaining a firm grip on the handlebars. Leverage is needed to resist twisting forces placed on the front wheel and handlebars by the weight of the bicycle pressing on uneven terrain. Leverage facilitates guiding the bicycle by allowing the rider to take sharp or carefully controlled turns.

Handlebars designed to create an aerodynamic forward leaning position have limited value in these situations. The forward lean is only appropriate in a portion of the slope and surface conditions. For any of the available hand positions, the ability to absorb vibration, to have access to control levers from other positions, and to have leverage for control are very limited.

Another type of prior art handlebar, currently found primarily on mountain bikes, is characterized by a generally straight cross bar. This handlebar provides higher level of leverage and ability to absorb jolts. A limitation of these handlebars is that they provide limited alternatives to the rider shifting weight to ascend or descend. Handlebar extensions, directed forward from the ends of the generally straight cross bar, are used to provide a handgripping position that is useful for the bicyclist when ascending. When using these extensions, the rider has no access to control levers. Furthermore, the arrangement does not provide a handgripping position that assists descent.

Both of the general types of prior art handlebars mentioned above have another particular problem encountered by competitive and recreational cyclists alike, especially in long distance riding. Fatigue can build up in a cyclist's shoulders, forearms, wrists, and hands due to stresses acting over a period of time on the aforementioned body parts. As noted above, these stresses build up more rapidly and are experienced to a greater degree under any of several conditions, including when the hands are used to grip the handlebar more tightly, when on descents the hands are used to actuate the brakes with more frequency and force, and when the hands and arms are absorbing vibrations of the bicycle as it travels over rough terrain. Two measures that reduce fatigue are: 1) providing different gripping positions which will allow the rider to alternate positions and rest certain muscles and joints while using others, and 2) positioning the hands and arms to work in a natural position in which the hands have higher strength and endurance and the position can be held without unusual effort.

The handlebars that create an aerodynamic position often do not provide the desired hand positions to reduce fatigue. With handlebars that create an aerodynamic position, the primary hand position provides the best available combination of comfort and control. The secondary positions provide lower levels of these benefits. Consequently, the secondary positions are less useful, particularly on rugged or sloped terrain. In these conditions, the handlebar arrangement has little ability to address fatigue through changing hand positions.

The generally straight cross bar type handlebar used often in mountain biking has only one gripping position, which can be expanded to two basic positions with the forward bar extensions. The hand position on the extensions creates a forward body position and provides a lack of access to control levers. In the primary hand position option, the hand position on the straight handlebar orients the hands so that the portion of the palms near the knuckles is facing downward. The wrist is positioned so that the long dimension of the wrist is in a horizontal plane. The rider will find, however, that the wrist is less susceptible to fatigue if it is in a vertical plane or a plane in between vertical and horizontal. To accomplish the horizontal wrist position required by a straight handlebar, the rider either raises the elbows or twists the forearms. Either response increases fatigue. As noted above, conditions such as rough terrain where these handlebars are often used will further increase the use and fatigue of the body parts mentioned above. With only the single primary hand position, the cyclist can become fatigued, resulting in diminished control and thus reducing safety for himself and others.

Handlebars of various shapes have been designed in the prior art to reduce certain types of fatigue. Commonly, the type of fatigue addressed is back and neck fatigue incurred as a result of a forward leaning, aerodynamic position. Most of these designs have had some utility in addressing only a different type of fatigue problem, and they have often used cumbersome mechanical and design configurations to provide the cyclist with alternative handgrip positions. In addition, the added positions often only allow the rider to sit more upright and do not assist the rider's control, particularly when shifting weight forward and rearward or when riding over and around obstacles. The issue of control has been addressed to only a minimal degree with respect to positioning of controls such as brake levers. The hand and body positions created do not provide the needed comfort and control.

Examples of prior art handlebar designs include U.S. Pat. No. 1,068,158 to Noack, and U.S. Pat. No. 588,166 to McCoy. The McCoy design provides several handgrip positions but provides only a raised gripping position with inadequate control for rough terrrain. The Noack patent discloses a rotatable handlebar which can be adjusted to the cyclist's morphology and, ostensibly, to the terrain as well. The handlebar itself must be adjusted through a relatively complex and heavy mechanical apparatus rather than simply the handgrip position of the cyclist on the handlebar. No provision is made for control levers. U.S. Pat. No. 439,129 to Durkee discloses a handlebar that also moves through mechanical mechanism when the rider is riding. In this design, the handlebars raise and come together, not providing an additional position for control of the velocipede but moving out of the way in case of a fall.

Other prior art handlebar designs include German Pat. No. 3,143,714 to Schauff and French Pat. No. 2,535,669 to Lohazic. Both the Schauff and the Lohazic designs disclose handlebars having curved end tubes. Neither of the designs provide hand positions that support a forward weight shift and a rearward weight shift to assist a rider to maintain control while ascending or descending steeply sloped terrain. The Schauff design provides a single hand grip position with a natural wrist orientation. The Lohazic design only provides two alternate positions for the cyclist, one for each adjusted position of the curved end tubes. One places the body more upright and one places the body more bent over, the two positions maintaining a similar weight distribution. Only a single hand grip position is provided unless the end tubes are disengaged and interchanged to provide the second position. This adjustment cannot be made while riding the bicycle.

Still other prior art handlebar designs include French Pat. No. 325,192 to Roques, Canadian Pat. No. 451,284 to Bouvier and U.K. Pat. No. 665,529 to Jouby. These prior art designs share the problems and drawbacks which have been discussed above with respect to some of the other cited patents.

Thus, a need still exists for a simple and efficient design that provides a number of alternate handgrip positions which are more comfortable, less fatiguing, and provide greater control. A particular situation where alternative handgrip positions are needed is when a cyclist rides on a variety of terrains including steeply sloped terrains, i.e. riding uphill on inclined terrains, riding downhill on inclined terrains, and riding on flat terrains. Therefore, a need exists for a design which provides handgrip positions for which the cyclist can shift weight from forward to rearward.

In addition, a need exists for a design that provides alternative hand positions to allow the cyclist to relieve stresses by shifting positions. Primary hand positions that place the wrist in a plane that is roughly vertical or in between vertical and horizontal are needed. The design should also provide the alternative handgrip areas without having to dismantle, re-orient, or undergo other tedious steps with the handlebars. The primary handgrip areas should allow the hands to be positioned so the palms do not face downward, but inward (toward a median plane). Of particular importance is the provision of a design which provides these handgripping positions to the cyclist with adequate leverage and accessibility to gear shift control mechanisms and brake control mechanisms. This is especially true when the cyclist is riding downhill, when the cyclist finds it essential to have access to brake controls without a significant loss of ability to steer of the bicycle.

In addition, it is particularly desirable that the handlebar design be capable of manufacture without great increase in cost and be simple enough to adapt for use with conventional bicycles.

DISCLOSURE OF THE INVENTION

The present invention meets the aforementioned needs by providing an improved handlebar assembly that has a plurality of handgrip positions and a plurality of locations for mounting shift and brake control devices not available heretofore. The handgrip positions generate less fatigue and increase rider control.

The improved handlebar assembly of the present invention accommodates various bicycle riding situations, including riding on rough, steeply sloped trails. The improved handlebar assembly also serves cyclists of diverse levels of experience, ranging from experienced cyclists who ride on relatively long rides to those cyclists who have relatively little experience.

Basically, the improved handlebar assembly of the present invention comprises a cross bar and a pair of end structures. Each end structure includes a pair of forwardly and rearwardly directed bars that extend from a respective one of the opposite ends of the cross bar. The combination of the cross bar with the pair of end structures having the pairs of forwardly and rearwardly directed bars forms the handlebar assembly in a generally H-shape.

In a preferred embodiment of the present invention, each of the end structures also includes an end attachment means attached between the pair of forwardly and rearwardly directed bars and being operable to attach the end structure to a respective one of the opposite ends of the cross bar. The end attachment means of a respective end structure also is releasable and adjustable, allowing the rider to adjust the angle of inclination of the end structures relative to the cross bar. The end attachment means on each of the end structures also allows the rider to adjust the width of the H-shaped handlebar assembly by sliding the end structures along the cross bar.

The cross bar of the handlebar assembly includes a center section for attachment to a stem of the bicycle and a pair of outwardly directed opposite side sections located on opposite sides of the center section. The outwardly directed opposite side sections may be either straight or arcuately shaped. Where the outwardly directed opposite side sections are straight, they typically form an included angle across the center section falling within a range of from 140 to 180 degrees.

The H-shaped handlebar assembly is rigidly mounted to the bicycle via a central attachment means at a central stem of the bicycle such that the forwardly and rearwardly directed bars of the respective end structures are inclined with respect to a horizontal plane at an angle falling within a range of from 0 to 45 degrees, and preferably from 5 to 25 degrees. The horizontal plane extends generally parallel to a plane approximating the surface on which the bicycle rests. The forwardly directed bars will be inclined above the plane while the rearwardly directed bars will be inclined below the plane. The angle of inclination of the end structures also can be adjusted by adjusting the central attachment means on the stem mounting the cross bar if the central attachment means is releasable and adjustable.

In the H-shaped handlebar assembly, the cross bar and the forwardly directed bar of a respective one end structure may form an included angle falling within a range of from 45 to 105 degrees, but preferably from 70 to 90 degrees. Similarly, the cross bar and the rearwardly directed bar of the respective end structure may form an included angle falling within a range of from 65 to 135 degrees, but preferably from 90 to 110 degrees. In a plane generally containing the cross bar and the forwardly and rearwardly directed bars of the end structures, the respective angles lying outwardly of the respective ends of the cross bar fall within a range of from 110 to 240 degrees, and preferably within a range of from 180 to 190 degrees.

Further, the forwardly directed bars of the end structures may form an included angle falling within a range of from 0 to 45 degrees above the aforementioned plane when containing only the cross bar and the rearwardly directed bars of the end structures. As an alternative, the forwardly directed bars of the end structures may form an included angle falling within a range of from 0 to 30 degrees below this plane.

The forwardly and rearwardly directed bars of the end structures meet the opposite ends of the cross bar at approximately the same location, producing a continuous form that the rider can use for a variety of hand positions. Depending on the length of the forwardly and rearwardly directed bars, these hand positions can run along the respective forwardly and rearwardly directed bars from forward of the cross bar to adjacent to the cross bar to rearward of the cross bar. In these hand positions, the wrist is generally oriented in a vertical plane or a plane in between vertical and horizontal. The cross bar itself provides additional hand positions, and the cross bar may be used jointly with forwardly or rearwardly directed bars to create hand positions.

The forwardly and rearwardly directed bars of the end structures also may have various shapes, including straight, arcuately shaped, bent, or connected sub-sections. The choice of shape depends on the particular hand positions to be provided, the assembly methods available, their costs, and the materials used. In a preferred embodiment, the forwardly directed bars are bent both upward and toward a longitudinal vertical median plane through the handlebar assembly (and through the front wheel of the bicycle), separating the left and right halves of the handlebar assembly and extending generally forward to rearward. The resulting forwardly directed bars form secure gripping areas forward of the cross bar. The amount of bend toward the median plane through the handlebar assembly is such that an included angle falling within a range of from 90 to 180 degrees is formed between the section of the forwardly directed bar closest to the cross bar and the section of the forwardly directed bar across the bend and containing the free end. The amount of upward bend is such that an angle across the two sections falls within the range of from 180 to 90 degrees. A similar arrangement can be created by attaching generally straight sub-sections instead of forming a bend to create the same angles.

In a preferred embodiment, the rearwardly directed bars are single straight bars. In alternative embodiments, each rearwardly directed bar is formed with bends across the middle of the member or at the end to create a shape comfortable for the palm and secure for grasping. The angles across the bends preferably fall within a range of from 180 to 90 degrees. A similar arrangement can be created by attaching generally straight sub-sections instead of forming a bend to create the same angles.

The forwardly and rearwardly directed bars provide a variety of areas on which to mount shift control levers and brake control levers. Preferably, the forwardly and rearwardly directed bars of each end structure have diameters approximating that of the cross bar, allowing use of standard control lever mounting devices. These areas provided for mounting include the length and ends of any portion of the forwardly and rearwardly directed bars.

The present invention also provides brake control devices for use in conjunction with the generally H-shaped handlebar assembly of the present invention. These brake control devices are mounted to the cross bar of the handlebar assembly and include a mounting means for mounting thereon, a lever housing attached to the mounting means, and a lever pivotally connected to the lever housing. The lever has a shape selected from a group consisting of T-shapes and rearward-directed L-shapes. The free end portions of T-shaped and L-shaped levers generally follow below the contour of the end bars and are provided to be accessible by a hand resting on one of the several handgrip positions provided on the handlebar assembly.

BRIEF DESCRIPTION OF THE DRAWINGS

The invention will be more readily understood by reference to the accompanying drawings. Throughout these drawings like reference numerals indicate like elements.

BEST MODE FOR CARRYING OUT THE INVENTION

Figure 1:
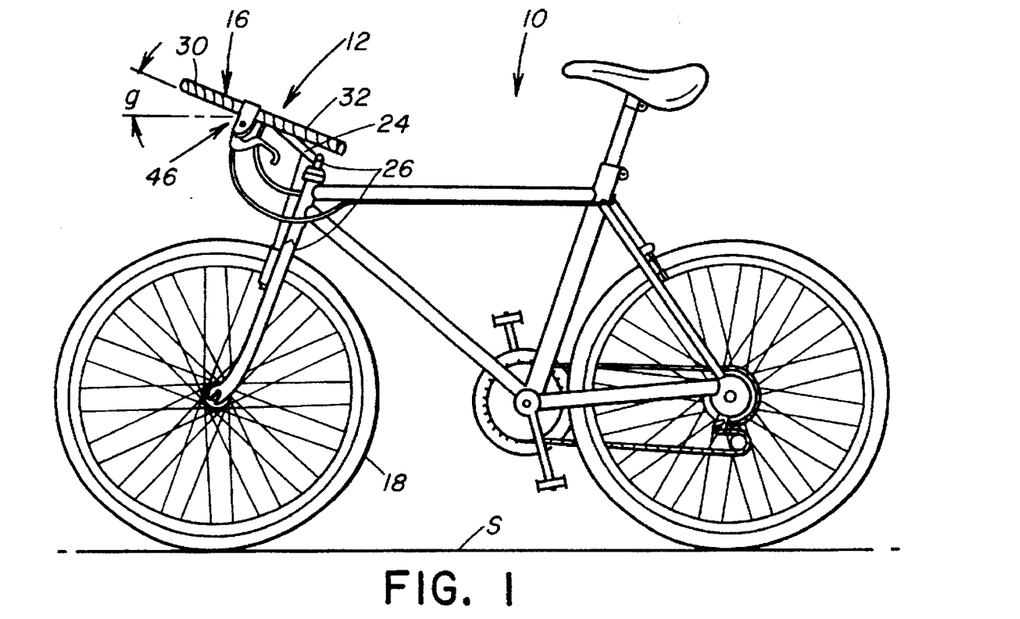
FIG. 1 is a side elevational view of a bicycle utilizing a generally H-shaped handlebar assembly of the present invention.
Figures 2, 2A:
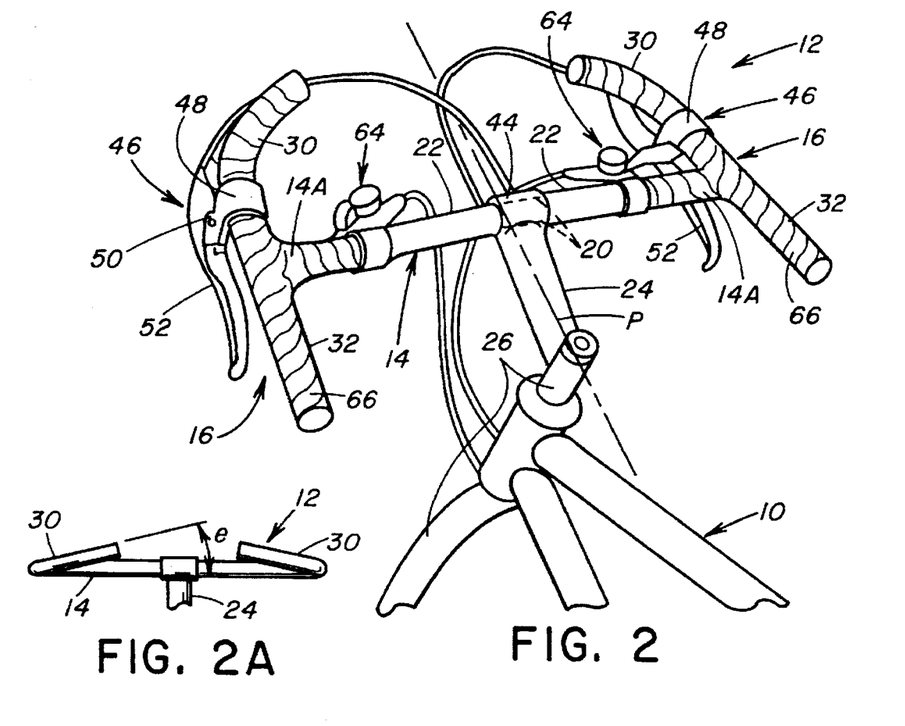
FIG. 2 is a perspective view of one embodiment of the handlebar assembly of the present invention with a forward grasping section of the forwardly directed bar of each end structure being bent upwardly and inwardly toward a longitudinal vertical median plane through the handlebar assembly.
FIG. 2A is a front elevational view of the handlebar assembly of FIG. 2.

Referring to the drawings, and particularly to FIGS. 1 and 2, there is illustrated a conventional bicycle 10 which incorporates a generally H-shaped handlebar assembly 12 of the present invention. In accordance with the principles of the present invention, the handlebar assembly 12 provides a plurality of hand gripping areas for the bicyclist, allowing more comfort and control, reducing fatigue in the cyclists's hands, wrists, forearms, and shoulders, and providing additional convenient mounting areas for shift and brake control devices.

Basically, the handlebar assembly 12 of the present invention includes an elongated cross bar 14 and a pair of end structures 16. The cross bar 14 extends in a generally transverse, or substantially perpendicular, relationship to a longitudinal vertical median plane P through the handlebar assembly 12 separating left and right halves thereof and generally containing a front wheel 18 of the bicycle 10. The median plane P also intersects the center of the cross bar 14. The end structures 16 are attached adjacent to respective opposite ends 14A of the cross bar 14 being spaced in opposite lateral directions away from the median plane P. The cross bar 14 per se can be a conventional cross bar such as found on a mountain bike type of bicycle. The end structures 16 thus are adapted to accommodate mounting on a conventional bicycle having a cross bar type of handlebar.

Figure 3:
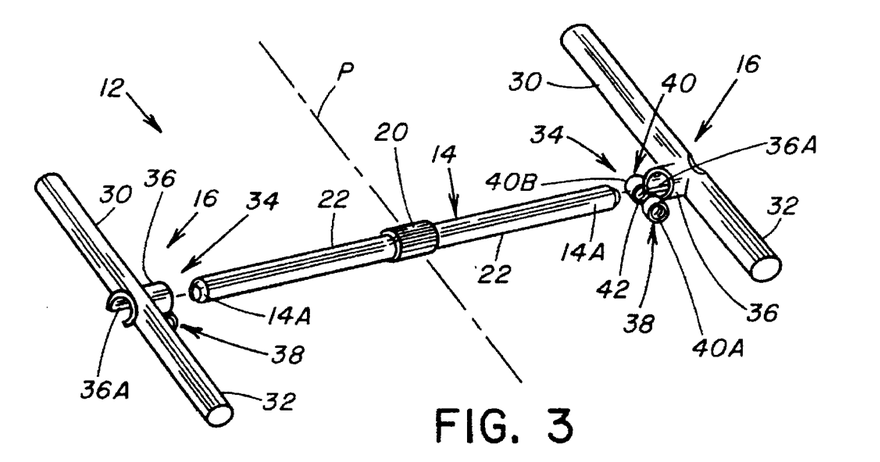
FIG. 3 is an exploded perspective view of another embodiment of the handlebar assembly of the present invention with each of a pair end structures having a releasable attachment means for connecting the end structure to one of the opposite ends of a cross bar of the handlebar assembly.
Figure 4:
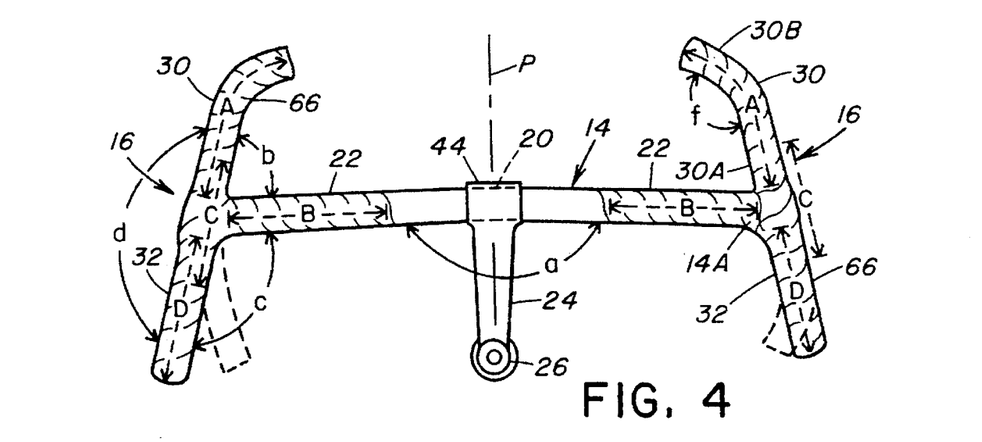
FIG. 4 is a top plan view of still another embodiment of the handlebar assembly of the present invention with the cross bar and forwardly and rearwardly directed bars of the end structures being disposed at different angular relationships to one another from those shown in the embodiment of FIG. 3.

More particularly, the cross bar 14 of the handlebar assembly 12 includes a center section 20 and a pair of elongated outwardly directed opposite side sections 22 being attached at inner ends to opposite ends of the center section 20. The center section 20 intersects the median plane P through the handlebar assembly 12 and is releasably or fixedly attached to a central stem 24 of a front pivotal fork 26 of the bicycle 10 which mounts the front wheel 18 thereof. The outwardly directed opposite side sections 22 extend in opposite lateral directions away from the center section 20 and are located on opposite sides of and extend in opposite lateral directions away from the median plane P. The outwardly directed opposite side sections 22 terminate in outer ends defining the pair of spaced apart opposite ends 14A of the cross bar 14. Also, the outwardly directed opposite side sections 22 of the cross bar 14 may be either straight, as shown in FIGS. 2, 3 and 4, or arcuately shaped. Where the outwardly directed opposite side sections 22 are straight, they typically form an included angle "a" across the center section 20 falling within a range of from 140 to 180 degrees.

Referring to FIGS. 2, 3 and 4, each end structure 16 of the handlebar assembly 12 includes a pair of forwardly and rearwardly directed bars 30, 32 extending in generally forward and rearward directions from a respective one of the opposite ends 14A of the cross bar 14. The forwardly and rearwardly directed bars 30, 32 of each end structure 16 are preferably cylindrical in shape and have diameters approximating that of the cross bar 14. The cylindrical bars 30, 32 are preferably made of a hollow tubing of high tensile strength and light weight, such as aluminum alloy. The cross bar 14 in combination with the end structures 16 thereby define the handlebar assembly 12 in a generally H-shape.

As shown in FIG. 3, each end structure 16 also includes an end attachment means 34 for rigidly attaching the end structure 16 between the forwardly and rearwardly directed bars 30, 32 thereof to a respective one of the opposite ends 14A of the cross bar 14. The end attachment means 34 preferably is operable for releasing and adjusting the rigid attachment of the end structure 16 to the respective one of the opposite ends 14A of the cross bar 14, allowing rotatable adjustment of the end structure 16 thereon to set the angles of inclination of the respective forwardly and rearwardly directed bars 30, 32 of the end structure 16 relative to the cross bar 14. "Rigidly attaching" as defined herein includes being fixedly attached, removably attached, and adjustably attached such that the end structures 16 may be rotated around the cross bar 14 to the desired angle and adjusted toward the center section 20 of the cross bar 14 the desired distance and then secured to prevent movement relative to the cross bar 14.

More particularly, in the one illustrative example of FIG. 3, the end attachment means 34 includes an adjustable annular collar 36 and a tightening mechanism 38. The annular collar 36, in the form of a slotted tube, is rigidly connected to the end structure 16 between the forwardly and rearwardly directed bars 30, 32, with the annular collar 36 being oriented generally transversely to the extent of the end structure 16 to surround a respective one of the opposite ends 14A of the cross bar 14. The annular collar 36 is of a diameter capable of closely fitting circumferentially around the cross bar 14. The diameter of the collar 36 is adjustable via the slot 36A therein allowing the collar 36 to be tightened around the cross bar 14 by adjustment of the tightening mechanism 38. In an illustrative example shown in FIG. 3, the tightening mechanism 38 includes a housing 40 having a pair of parts 40A, 40B respectively fixedly attached to opposite sides of the slot 36A and bridging the slot 36A, and a fastener 42, such as an allen screw, which is threaded through the parts 40A, 40B of the housing 40. It will be appreciated by those of ordinary skill in the art that the end attachment means 34 described above is illustrative only and that other means for connecting the forwardly and rearwardly directed bars 30, 32 to the cross bar 14 may be employed.

Referring to FIG. 4, the cross bar 14 and the forwardly directed bar 30 of a respective one end structure 16 may form an included angle "b" falling within a range of from 45 to 105 degrees, but preferably from 70 to 90 degrees. Similarly, the cross bar 14 and the rearwardly directed bar 32 of the respective end structure 16 may form an included angle "c" falling within a range of from 65 to 135 degrees, but preferably from 90 to 110 degrees. In a plane generally containing the cross bar 14 and the forwardly and rearwardly directed bars 30, 32 of the end structures 16, the pairs of forwardly and rearwardly directed bars 30 may thus form an angle "d" lying outwardly of the respective opposite ends 14A of the cross bar 14 falling within a range of from 110 to 240 degrees, preferably within a range of from 180 to 190 degrees.

As seen in FIGS. 1–6, each forwardly directed bar 30 and each rearwardly directed bar 32 of the respective end structures 16 is of a length sufficient to be grasped by the cyclist when attached to the cross bar 14, such as of a length at least approaching, such as over half, the width of an adult human hand. The length and diameter of the forwardly directed bar 30 and the rearwardly directed bar 32 may differ and may be altered to allow room for controls to be mounted thereon.

Also, as seen in FIGS. 2–4, the forwardly and rearwardly directed bars 30, 32 of the end structures 16 also may have various shapes, including straight, arcuately shaped, bent, or connected sub-sections. The choice of shape depends on the particular hand positions to be provided, the assembly methods available, their costs, and the materials used. Inclining and bending inwardly the forwardly directed bars 30 provides greater comfort and control to the cyclist when gripping at such positions. In a preferred embodiment, the forwardly directed bars 30 are bent both upward and toward the median plane P through the handlebar assembly 12, forming a secure gripping area forward of the cross bar 14. Referring to FIG. 2A, the forwardly directed bars 30 of the end structures 16 may form an included angle "e" falling within a range of from 0 to 90 degrees above a plane when containing only the cross bar 14 and the rearwardly directed bars 32 of the end structures 16.

As seen in FIG. 4, the amount of bend toward the longitudinal median plane P through the handlebar assembly 12 is such that an included angle "f" falling within a range of from 90 to 180 degrees is formed between an inner section 30A of the forwardly directed bar 30 closest to the cross bar 14 and an outer section 30B of the forwardly directed bar 30 across the bend and containing the free end. The amount of upward bend is the same as described above with reference to FIG. 2A. A similar arrangement can be created by attaching generally straight sub-sections instead of forming a bend to create the same angles.

In a preferred embodiment, the rearwardly directed bars 32 are single straight bars. In alternative embodiments as seen in FIG. 4, each rearwardly directed bar 32 is formed with bends across the middle of the bar or at the end to create a shape comfortable for the palm and secure for grasping. The angles across the bends preferably fall within a range of from 90 to 180 degrees. A similar arrangement can be created by attaching generally straight sub-sections instead of forming a bend to create the same angles.

The H-shaped handlebar assembly is rigidly mounted to the bicycle via a central attachment means 44 at the end of the central stem 24 of the bicycle 10 such that the forwardly and rearwardly directed bars 30, 32 of the respective end structures 16 are inclined with respect to a horizontal plane at an angle "g" (see FIG. 1) falling within a range of from 0 to 45 degrees, preferably from 5 to 25 degrees. The horizontal plane extends parallel to a plane approximating the surface S on which the bicycle 10 rests. The forwardly directed bars 30 will be inclined above the plane while the rearwardly directed bars 32 will be inclined below the plane. The angle of inclination of the end structures 16 also can be adjusted by adjusting the central attachment means 44 on the stem 24 mounting the cross bar 14 if the central attachment means 44 is releasable and adjustable. This inclination of the handlebar assembly 12 enables the cyclist to grasp a plurality of different hand gripping areas, defined below, with greater comfort and convenience, and enables the cyclist to have a high level of control of the bicycle 10 from these positions.

As described above, the forwardly and rearwardly directed bars 30, 32 of the respective end structures 16 meet with one another at the opposite ends 14A of the cross bar 14 so as to provide the end structures 16 in the form of continuous end bars having substantially unobstructed exterior surface areas thereabout, as seen in FIGS. 3–6, along which a variety of different hand gripping positions or areas are defined that the rider can use. Depending on the respective lengths of the forwardly and rearwardly directed bars 30, 32, these hand gripping areas can run along the respective forwardly and rearwardly directed bars 30, 32 from forward of the cross bar 14 to adjacent to the cross bar 14 to rearward of the cross bar 14. In these hand gripping areas, the wrist is generally oriented in a vertical plane or a plane in between vertical and horizontal. The cross bar 14 itself provides additional hand gripping areas, and the cross bar 14 may be used jointly with forwardly or rearwardly directed bars 30, 32 to provide hand gripping areas.

Referring to FIG. 4, there is shown the range of alternative hand gripping areas. These include a forward gripping area A, a cross bar gripping area B, a neutral gripping area C, and a rearward gripping area D. The forward gripping area A is defined as the area in which the cyclist's hands are located over the forwardly directed bars 30. The cross bar gripping area B is defined as the area in which the cyclist's hands are located over the portions of the opposite side sections 22 of the cross bar 14 adjacent to the end structures 16. The neutral gripping area C is defined as the area in which the bicyclist's hands are located over the region of merger between the forwardly and rearwardly directed bars 30, 32, with the thumbs placed forward of or above the cross bar 14. The rearward gripping area D is defined as the area in which the cyclist's hands are located at least partially over the rearwardly directed bar 32.

Each of these areas have advantages under different terrain and riding conditions. The cyclist may alternate between areas to provide control through body weight distribution and steering leverage, to provide access to control levers, or to increase comfort and reduce fatigue. The forward gripping area A is useful for uphill riding, the cross bar and neutral gripping areas B, C are useful for riding on gently sloped or flat terrain, and the rearward gripping area D is useful for downhill riding. The cross bar and neutral gripping areas B, C may be alternated with the forward gripping area A when ascending. The cross bar and neutral gripping areas B, C may be alternated with the rearward gripping area D when descending. To reduce fatigue in the hands and arms, in the back, or other parts of the body, any of the gripping areas may be used in alternation on flat or moderately sloped terrain. These different areas provide the cyclist with more comfortable and convenient hand gripping positions which reduce stress and fatigue to the rider's wrists, forearms, shoulders, and hands.

Furthermore, these different gripping areas are advantageous in providing the cyclist with greater leverage for steering control in ascending and descending, in allowing body positioning to make effective use of muscle groups, in providing access to control levers, and in improving weight distribution of the cyclist on the bicycle. In addition, the forward gripping area A or cross bar gripping B may be used with a forward leaning position to reduce the frontal area for improved aerodynamics relative to the other positions.

In conventional mountain bike handle bar designs, which generally include only a cross bar 14, the cyclist's hand are placed in a single position similar to the cross bar gripping area B. This position encourages the rider to hold the elbows upward and outward which can lead to fatigue in the shoulders. If the cyclist desires to bring the elbows close to his body, the resulting twisting in the forearm accelerates and exacerbates fatigue in that area. The design of the handlebar assembly 12 of the present invention thus allows the cyclist to more comfortably grip these several alternative gripping areas of the handlebar assembly 12. The gripping positions A, C, and D on the end structures 16 reduce fatigue by allowing the elbows to be held closer to the body with out straining the forearm. This placement of the hand is more natural to the wrist and beneficial to the user. During extended bicycle rides, rides over rough terrain, rides requiring extended grasping of brake levers, and rides where reduction of fatigue would be beneficial, this placement of the hand is preferable. The elbows may still be raised is situations where this help the rider maintain control. Fatigue is further reduced by changing hand positions as is allowed by the provided griping areas A through D.

It is advantageous for the cyclist, while riding the bicycle 10 employing the handlebar assembly 12 of the present invention, to periodically change the gripping area the cyclist is utilizing so that the fatigue build up in the forearms, shoulders, wrists, and hands is further reduced thereby further relieving stress and discomfort and improving control and speed. It will be appreciated that the above described gripping areas allow the cyclist to more readily maintain control of direction and speed when going from flat terrain to uphill to downhill travel. It will further be appreciated that the above described gripping areas allow the cyclist to change posture for the various riding conditions on steeply sloped or flat terrain to shift the cyclist's center of gravity as desired. This results in safer, more efficient and more comfortable riding configuration for the cyclist's body.

Further as seen in FIG. 2, the forwardly directed bar 30 of each end structure 16 is of a sufficient length to allow a brake control device 46 to be mounted on a portion thereof with a mount, or mounting means, 48. The device 46 includes a lever housing 50 attached to mount 48 to house a lever 52 which is pivotally connected at one end to the housing 50 such that the lever 52 is rotatable toward the end structure 16. The lever 52 provided, a conventional length or longer, is of a sufficient length to be pulled by the fingers toward the end structure 16 when the hand is placed either over the neutral gripping area C or the rearward handgrip area D.

This arrangement allows conventionally available levers to be used with increased convenience, increased control of braking effort modulation, and decreased arm fatigue in braking situations on flat terrain or descending sloped terrain. The brakes may be actuated with the hand in a more natural position that reduces fatigue and allows a high level of steering control.

It will be appreciated that the above mentioned elements of the brake control mechanism 46 are well known and described herein illustratively, and a broad variety of brake control means described hereto could be used in the practice of this invention.

Figure 5:
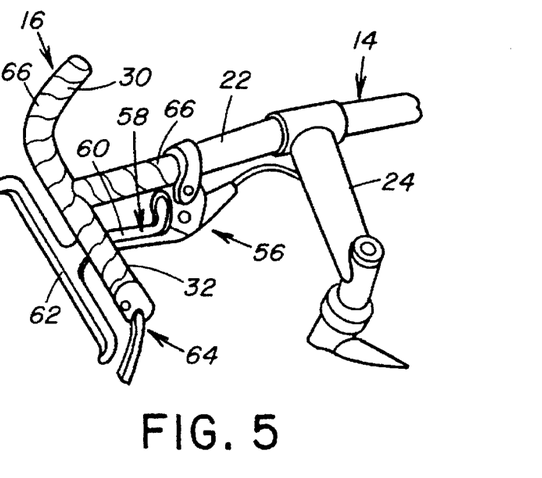
FIG. 5 is a fragmentary perspective view of the handlebar assembly of FIG. 4 with a T-shaped lever brake control device mounted on the cross bar and a gear control shifter mounted on the rearwardly directed bar of the end structure of the handlebar assembly.
Figure 6:
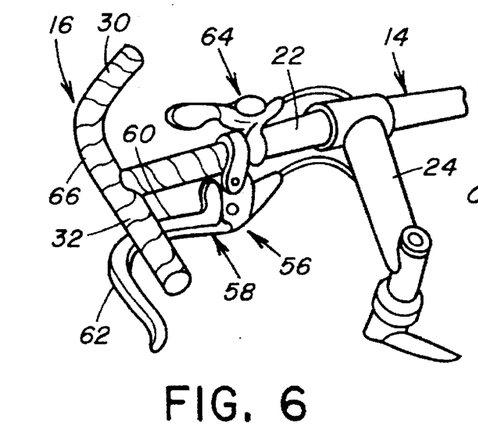
FIG. 6 is a fragmentary perspective view of the handlebar assembly of FIG. 4 with an L-shaped lever as part of a combination brake and shift control device mounted on the cross bar of the handlebar assembly.

Referring to FIGS. 5 and 6, there is illustrated two embodiments of an improved brake control mechanism 56 in accordance with the present invention. In the embodiment of FIG. 5, the improved brake control mechanism 56 is provided with a lever 58 having an extension 60 which terminates in an elongated crossing end portion 62, forming a T-shape. The brake control mechanism 56 in this preferred configuration is mounted on the cross bar 14, allowing the fullest use of all the provided gripping areas. The extension 60 is of a sufficient length such that it extends below the cross bar 14 to place the T-shaped portion 62 in a position generally below each end structure 16. The T-shaped portion 62 forms an included angle with the extension 60 generally the same as the included angle "b" between the forwardly directed bar 30 and the cross bar 14 so that the T-shaped portion 62 follows a course generally below the end structure 16. This configuration allows for the placement of the cyclist's hands on any portion of the handlebar assembly 12 with the lever 58 being accessible by the fingers of the cyclist's hands when placed on the forward gripping area A, the cross bar gripping area B, the neutral gripping area C, or the rearward gripping area D.

In the alternative embodiment of FIG. 6, the improved brake control mechanism 56 is provided with the lever 58 having an extension 60 which terminates in a rearward-directed L-shaped portion 62. The brake control mechanism 56 in this configuration is also mounted on the cross bar 14, the extension 60 also being of a sufficient length such that it extends below the cross bar 14 to place the L-shaped portion 62 in a position generally below each end structure 16. The L-shaped portion 62 also forms an included angle with the extension 60 generally the same as the included angle "c" between the rearwardly directed bar 32 and the cross bar 14 so that the L-shaped portion 62 follows a course generally below the rearwardly directed bar 32. The lever 58 in this configuration is thus accessible by the cyclist's fingers when the cyclists's hands are placed on the cross bar gripping area B, the neutral gripping area C, or the rearward gripping area D.

The difference between the lever 58 having the L-shaped section 62 (FIG. 6) and one having the T-shaped section 62 (FIG. 5) is that the lever 58 with the L-shaped section 62 is not easily accessible from the forward gripping area A, but is lighter and less costly. As the cyclist rides uphill when gripping the forward gripping area A, immediate access to brake levers is less necessary as a result of the rapid effect of gravity in slowing the bicycle.

To further conserve useful space on the provided gripping areas, a conventional gear shift device 64 used in conjunction with the handlebar assembly 12 may be mounted on the inner portions of opposite side sections 22 on the cross bar 14. Alternatively, as seen in FIG. 6, the gear shift device 64 may be mounted in conjunction with the improved brake control device 56, or the gear shift device 64 may be mounted on the rear end of the rearwardly directed bar 32, as seen in FIG. 5. Arranging the gear shift device 64 in any of these variety of locations in conjunction with the handlebar assembly 12 increases the amount of usable gripping space on the provided gripping areas.

As seen in all figures except FIG. 3, the above-described hand gripping areas A, B, C, D of the handlebar assembly 12 are preferably covered with a grip tape 66 or other suitable means for increasing friction between the rider's hands and the hand gripping areas. Similarly, suitable means for providing a degree of cushioning between the rider's hands and the handlebar assembly 12 will often be attached to in the hand gripping areas A, B, C, D.

The present invention has been described in detail with reference to particular embodiments thereof, but it will be understood that various other modifications can be made within the spirit and scope of this invention.

I claim:

1. A handlebar assembly for use on a bicycle comprising:
   (a) an elongated cross bar extending in a generally transverse relationship to a longitudinal vertical median plane through said handlebar assembly and having a pair of opposite ends spaced in opposite lateral directions away from said longitudinal vertical median plane; and
   (b) a pair of end structures attached adjacent to said respective opposite ends of said cross bar, each of said end structures including a pair of forwardly and rearwardly directed bars extending in generally forward and rearward opposite directions from said cross bar and in a substantially common plane with said cross bar such that said cross bar in combination with said end structures thereby define said handlebar assembly in a generally H-shape;
   (c) said forwardly and rearwardly directed bars of each of said end structures meeting with one another at said respective one of said opposite ends of said cross bar and simultaneously providing, without adjustment of said respective end structure, forward and rearward portions for grasping being located forward and rearward of said cross bar, each of said forwardly and rearwardly directed bars having a substantially unobstructed exterior surface area thereabout along which a plurality of different hand positions are defined and together displaced from one another ranging from forwardly of said cross bar to rearwardly of said cross bar.

2. The assembly of claim 1 wherein each of said end structures also includes an end attachment means located between and attached to said forwardly and rearwardly directed bars thereof for attaching said forwardly and rearwardly directed bars to one of said opposite ends of said cross bar.

3. The assembly of claim 2 wherein said end attachment means of each of said end structures is operable for releasably and adjustably attaching said respective end structures to said respective one of said opposite ends of said cross bar so as to allow rotatable adjustment of said respective end structure thereon to set angles of inclination of said respective forwardly and rearwardly directed bars of said end structures relative to said cross bar.

4. The assembly of claim 1 wherein said forwardly and rearwardly directed bars of said respective end structures are inclined with respect to a horizontal plane at angles falling within a range of from 0 to 45 degrees with said forwardly directed bars being inclined above and said rearwardly directed bars being inclined below said horizontal plane.

5. The assembly of claim 1 further comprising:
   a brake control device mounted on said cross bar, said brake control device including
      means for mounting said brake control device on said cross bar,
      a lever housing attached to said mounting means, and
      a lever pivotally connected to said lever housing, said lever having a shape selected from the group of T-shapes and L-shapes.

6. The assembly of claim 1 wherein said cross bar and said forwardly directed bar of each of said end structures form an included angle falling within a range of from 45 to 105 degrees.

7. The assembly of claim 1 wherein said cross bar and said rearwardly directed bar of each of said end structures form an included angle falling within a range of from 65 to 135 degrees.

8. The assembly of claim 1 wherein said forwardly directed bar of each of said end structures relative to a plane containing said cross bar and said rearwardly directed bar of said respective end structure form an included angle falling within a range of from 0 to 45 degrees.

9. The assembly of claim 1 wherein said plurality of different hand positions also include positions defined along portions of both said forwardly and rearwardly directed bars.

10. A handlebar assembly for use on a bicycle, comprising:
    (a) an elongated cross bar extending in a generally transverse relationship to a longitudinal vertical median plane through said handlebar assembly and having a pair of opposite ends spaced in opposite lateral directions away from said longitudinal vertical median plane; and
    (b) a pair of end structures attached adjacent to said respective opposite ends of said cross bar, each of said end structures including a pair of forwardly and rearwardly directed bars extending in generally forward and rearward opposite directions from said cross bar and in a substantially common plane with said cross bar such that said cross bar in combination with said end structures thereby define said handlebar assembly in a generally H-shape;
    (c) said forwardly and rearwardly directed bars of each of said end structures meeting with one another at said respective one of said opposite ends of the cross bar, each of said forwardly and rearwardly directed bars having a substantially unobstructed exterior surface area thereabout along which a plurality of different hand positions are defined and together displaced from one another ranging from forwardly of said cross bar to rearwardly of said cross bar;

(d) one of said forwardly and rearwardly directed bars of each of said end structures having a bend formed therein defining an inner section adjacent to said cross bar and an outer section remote from said cross bar and extending from said inner section both upwardly and toward said longitudinal vertical median plane of said handlebar assembly.

11. The assembly of claim 10 wherein said inner and outer sections of said one of said forwardly and rearwardly directed bars of said end structure form an included angle which falls within a range of from 90 to 180 degrees.

12. A handlebar assembly for use on a bicycle, comprising:

(a) an elongated cross bar extending in a generally transverse relationship to a longitudinal vertical median plane through said handlebar assembly and having a pair of opposite ends spaced in opposite lateral directions away from said longitudinal vertical median plane; and (b) pair of end structures attached adjacent to said respective opposite ends of said cross bar, each of said end structures including a pair of forwardly and rearwardly directed bars extending in generally forward and rearward opposite directions from said cross bar and in a substantially common plane with said cross bar such that said cross bar in combination with said end structures thereby define said handlebar assembly in a generally H-shape, each of said end structures also including an end attachment means located between and attached to said forwardly and rearwardly directed bars for attaching said forwardly and rearwardly directed bars to one of said opposite ends of said cross bar;

(c) said forwardly and rearwardly directed bars of each of said end structures meeting with one another at said respective one of said opposite ends of the cross bar, each of said forwardly and rearwardly directed bars having a substantially unobstructed exterior surface area thereabout along which a plurality of different hand positions are defined and together displaced from one another ranging from forwardly of said cross bar to rearwardly of said cross bar;

(d) said end attachment means of each of said end structures being operable for releasably and adjustably attaching said respective end structure to said respective one of said opposite ends of said cross bar so as to allow slidable adjustment of the positions of said respective end structures along said cross bar to adjust the distance between said respective end structures and thereby adjust the width of said H-shaped handlebar assembly.

13. A handlebar assembly for use on a bicycle, comprising:

(a) an elongated cross bar extending in a generally transverse relationship to a longitudinal vertical median plane through said handlebar assembly, said cross bar having a center section attachable to a center stem of said bicycle and intersecting with said longitudinal vertical median plane, said cross bar also having a pair of outwardly directed opposite side sections being attached at inner ends to opposite ends of said center section, said outwardly directed opposite side sections extending in opposite lateral directions away from said center section and being located on opposite sides of and extending in opposite lateral directions away from said longitudinal vertical median plane, said outwardly directed opposite side sections terminating in outer ends defining a pair of spaced apart opposite ends of said cross bar; and (b) a pair of end structures attached to said respective opposite ends of said cross bar, each of said end structures including a pair of forwardly and rearwardly directed bars extending in generally forward and rearward directions from said cross bar and in a substantially common plane with said cross bar such that said cross bar in combination with said end structures define said handlebar assembly in a generally H-shape, each of said end structures also including an end attachment means for attaching said forwardly and rearwardly directed bars at a location therebetween to one of said opposite ends of said cross bar;

(c) said forwardly and rearwardly directed bars of each of said end structures meeting with one another at said respective one of said opposite ends of the cross bar, each of said forwardly and rearwardly directed bars having a substantially unobstructed exterior surface area thereabout along which a plurality of different hand positions are defined and together displaced from one another ranging from forwardly of said cross bar to rearwardly of said cross bar;

(d) said end attachment means of each of said end structures being operable for releasably and adjustably attaching said respective end structure to said respective one of said opposite ends of said cross bar so as to allow slidable adjustment of the positions of said respective end structures along said cross bar to adjust the distance between said respective end structures and thereby adjust the width of said H-shaped handlebar assembly.

14. A handlebar assembly for use on a bicycle, comprising:

(a) an elongated cross bar extending in generally transverse relationship to a longitudinal vertical median plane through said handlebar assembly, said cross bar having a center section attachable to a center stem of said bicycle and intersecting with said longitudinal vertical median plane, said cross bar also having a pair of outwardly directed opposite side sections being attached at inner ends to opposite ends of said center section, said outwardly directed opposite side sections extending in opposite lateral directions away from said center section and being located on opposite sides of and extending in opposite lateral directions away from said longitudinal vertical median plane, said outwardly directed opposite side sections terminating in outer ends defining a pair of spaced apart opposite ends of said cross bar; and (b) a pair of end structures attached to said respective opposite ends of said cross bar, each of said end structures including a pair of forwardly and rearwardly directed bars extending in generally forward and rearward directions from said cross bar and in a substantially common plane with said cross bar such that said cross bar in combination with said end structures define said handlebar assembly in a generally H-shape;

(c) said forwardly and rearwardly directed bars of each of said end structures meeting with one another at said respective one of said opposite ends of said cross bar and simultaneously providing, without adjustment of said respective end structure, forward and rearward portions for grasping being located forward and rearward of said cross bar, each of said forwardly and rearwardly directed bars having a substantially unobstructed exterior surface area thereabout along which a plurality of different hand positions are defined and together displaced from one another ranging from forwardly of said cross bar to rearwardly of said cross bar.

15. The assembly of claim 14 wherein said outwardly directed opposite side sections of said cross bar are substantially straight in configuration and together form an included angle across said center section falling within a range of from 140 to 180 degrees.

16. The assembly of claim 14 wherein said pair of forwardly and rearwardly directed bars located at the same one of said opposite ends of said cross bar are formed by a single end bar having a forward section and rearward section respectively extending in generally forward and rearward directions from said respective one of said opposite ends of said cross bar.

17. The assembly of claim 14 wherein each of said end structures also includes an end attachment means for attaching said forwardly and rearwardly directed bars at a location therebetween to one of said opposite ends of said cross bar.

18. The assembly of claim 17 wherein said end attachment means of each of said end structures is operable for releasably and adjustably attaching said respective end structures to said respective one of said opposite ends of said cross bar so as to allow rotatable adjustment of said respective end structure thereon to set angles of inclination of said respective forwardly and rearwardly directed bars of said end structures relative to said cross bar.

19. The assembly of claim 18 wherein said forwardly and rearwardly directed bars of said respective end structures are inclined with respect to a horizontal plane at an angle falling within a range of from 0 to 45 degrees with said forwardly directed bars being inclined above and said rearwardly directed bars being inclined below said horizontal plane.

20. The assembly of claim 14 further comprising:
a brake control device mounted on said cross bar, said brake control device including
means for mounting said brake control device on said cross bar,
a lever housing attached to said mounting means, and
a lever pivotally connected to said lever housing, said lever having a shape selected from the group of T-shapes and L-shapes.

21. The assembly of claim 14 wherein said cross bar and said forwardly directed bar of each said end structures form an included angle falling within a range of from 45 to 105 degrees.

22. The assembly of claim 14 wherein said cross bar and said rearwardly directed bar of each of said end structures form an included angle falling within a range of from 65 to 135 degrees.

23. The assembly of claim 14 wherein said forwardly directed bar of each of said end structures relative to a plane containing said cross bar and said rearwardly directed bar of said end structure form an included angle falling within a range of from 0 to 45 degrees.

24. The assembly of claim 14 wherein said plurality of different hand positions also include positions defined along portions of both said forwardly and rearwardly directed bars.

25. The assembly of claim 14 further comprising:
a gear shift control device mounted on said rearwardly directed bar of at least one of said end structures.

26. A handlebar assembly for use on a bicycle, comprising:

(a) an elongated cross bar extending in generally transverse relationship to a longitudinal vertical median plane through said handlebar assembly, said cross bar having a center section attachable to a center stem of said bicycle and intersecting with said longitudinal vertical median plane, said cross bar also having a pair of outwardly directed opposite side sections being attached at inner ends to opposite ends of said center section, said outwardly directed opposite side sections extending in opposite lateral directions away from said center section and being located on opposite sides of and extending in opposite lateral directions away from said longitudinal vertical median plane, said outwardly directed opposite side sections terminating in outer ends defining a pair of spaced apart opposite ends of said cross bar; and (b) a pair of end structures attached to said respective opposite ends of said cross bar, each of said end structures including a pair of forwardly and rearwardly directed bars extending in generally forward and rearward directions from said cross bar and in a substantially common plane with said cross bar such that said cross bar in combination with said end structures define said handlebar assembly in a generally H-shape;

(c) said forwardly and rearwardly directed bars of each of said end structures meeting with one another at said respective one of said opposite ends of the cross bar, each of said forwardly and rearwardly directed bars having a substantially unobstructed exterior surface area thereabout along which a plurality of different hand positions are defined and together displaced from one another ranging from forwardly of said cross bar to rearwardly of said cross bar;

(d) one of said forwardly and rearwardly directed bars of each of said end structures having a bend formed therein defining an inner section adjacent to said cross bar and an outer section remote from said cross bar and extending from said inner section both upwardly and toward said longitudinal vertical median plane of said handlebar assembly.

27. The assembly of claim 26 wherein said inner and outer sections of said one of said forwardly and rearwardly directed bars of said end structure form an included angle which falls within a range of from 90 to 180 degrees.

* * * * *